US012602122B2

(12) United States Patent
Chin-Chung et al.

(10) Patent No.: US 12,602,122 B2
(45) Date of Patent: Apr. 14, 2026

(54) INFORMATION HANDLING SYSTEM TOUCH DETECTION DEVICE GROUNDING AND SELF-TEST

(71) Applicant: Dell Products L.P., Round Rock, TX (US)

(72) Inventors: Wu Chin-Chung, New Taipei City (TW); Che-Jung Chang, Taipei (TW); Yueh-Ching Lu, Taipei City (TW); Yong-Teng Lin, Yilan (TW)

(73) Assignee: Dell Products L.P., Round Rock, TX (US)

( * ) Notice: Subject to any disclaimer, the term of this patent is extended or adjusted under 35 U.S.C. 154(b) by 55 days.

(21) Appl. No.: 18/224,655

(22) Filed: Jul. 21, 2023

(65) Prior Publication Data

US 2025/0028400 A1    Jan. 23, 2025

(51) Int. Cl.
*G06F 3/038* (2013.01)
*G06F 3/0354* (2013.01)

(52) U.S. Cl.
CPC .......... *G06F 3/038* (2013.01); *G06F 3/03547* (2013.01)

(58) Field of Classification Search
CPC .............................. G06F 3/038; G06F 3/03547
See application file for complete search history.

(56) References Cited

U.S. PATENT DOCUMENTS

| | | | |
|---|---|---|---|
| 9,250,754 B2 | 2/2016 | Tunuta et al. | |
| 10,068,728 B2 | 9/2018 | Huska et al. | |
| 10,228,720 B2 | 3/2019 | Degner et al. | |
| 10,313,497 B2 | 6/2019 | Hobson et al. | |
| 2004/0061687 A1* | 4/2004 | Kent ..................... | G06F 3/0418 |
| | | | 345/173 |
| 2009/0025987 A1* | 1/2009 | Perski ................. | G06F 3/04166 |
| | | | 178/18.03 |
| 2017/0364184 A1 | 12/2017 | Weinerth et al. | |

* cited by examiner

*Primary Examiner* — Abhishek Sarma

(74) *Attorney, Agent, or Firm* — Zagorin Cave LLP; Robert W. Holland

(57) ABSTRACT

An information handling system includes a touchpad that accepts touch inputs to move a cursor on a display and that deflects at a front side to accept button inputs. A bracket is disposed between a touch detection surface and circuit board of the touchpad to bias the touch detection surface up and deflect in response to a push down as a button input. Conical spring ground devices coupled to the circuit board on opposing sides of the bracket interface with an ohmmeter included on the circuit board that detects a resistance from a first ground device through the system ground to a second ground device. Resistance across ground is applied by the touchpad processor to adjust touch detection sensitivity and avoid ghost inputs.

14 Claims, 6 Drawing Sheets

40

42

44

46

48

50

52

50

56 — POWER UP

58 — MEASURE RESISTANCE

60 — ADJUST GHOST FINGER SETTING TO RESISTANCE

INFORMATION HANDLING SYSTEM TOUCH DETECTION DEVICE GROUNDING AND SELF-TEST

BACKGROUND OF THE INVENTION

Field of the Invention

The present invention relates in general to the field of information handling system touch detection, and more particularly to an information handling system touch detection device grounding and self-test.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components, a keyboard and a touchpad, and rotationally couples with hinges to a lid housing portion that integrates a display, which in some instances is a touchscreen display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

To provide a mobile end user with a mouse-type of pointing cursor control, the portable information handling system touchscreen typically has a touch surface exposed near the keyboard that accepts end user touches and converts the touches to cursor control commands. Generally, touchpads include left and right push button functionality that accepts inputs similar to left and right mouse button presses. In some instances the touch surface is mounted on a trigger bracket so that the end user can make push button inputs with left and right presses on the front side of the touchpad. The touchpad moves slightly downward in response to an end user press to provide feedback to the end user of the button press completion. For instance, in operation the end user moves a finger on the touchpad upper surface to point a cursor to a desired location and then presses down on the left or right front corner of the touchpad to enter a right or left mouse button input.

One difficulty related to touchpad use is that touches at a touchpad can be difficult to interpret, such as distinguishing between intended inputs and incidental touches. Touchpads typically have a processing resource, such as an MCU, that interfaces with capacitive touch sensors in the touchpad touch detection surface that analyzes signals from the touch detection surface to distinguish intended touches from incidental touches. Unfortunately, the sensitive nature of the touch detection surface can result in false touch detections, known as ghost inputs, that can disrupt an end user experience. The difficulty of analyzing detected touches can increase where a touchpad pivots to accept a press button input at the touchpad front side. For instance, the touch surface can pivot relative to the touchpad processing resource circuit board so that signal and ground continuity is difficult to maintain. One way of grounding the touchpad is to attach the touchpad to the information handling system housing with a screw that passes through a conductive aluminum foil or other conductive material. When the ground interface is not optimal, ghost input detection at the touchpad touch detection surface becomes a greater problem that can lead to system failure. These types of failures may occur at any time during normal use when touch detection surface movement disrupts the ground interface.

SUMMARY OF THE INVENTION

Therefore, a need has arisen for a system and method which improves touch detection surface ground and touch detection sensitivity.

In accordance with the present invention, a system and method are provided which substantially reduce the disadvantages and problems associated with previous methods and systems that adapt a touch detection surface sensitivity to ground. First and second ground devices, such as conical springs, extend from a touchpad circuit board to contact system ground, such as a housing cover palm rest. Measurements of resistance at the touchpad between the ground devices and through system ground is applied to compensate touchpad sensitivity.

More specifically, a portable information handling system processes information with a processor that executes instructions interfaced to a memory that stores the instructions and information. Input/output devices interface with the processor and integrate in a portable housing to support mobile operations. For instance, a touchpad couples to a housing cover portion of the portable housing to accept cursor movement inputs as finger touches to a touch detection surface and front side presses as button inputs. At each of the opposing front corners of a circuit board of the touchpad, a ground device, such as a conical spring, is directly against the system housing, such as a palm rest of the housing cover portion, to interface with ground. A processing resource of the touchpad, such as an MCU, that detects touches based upon capacitance of the touch detection surface, includes an ohmmeter that measures resistance from a first ground device through the system ground and to the second ground device. The resistance is applied to adjust touch detection sensitivity so that errors, such as ghost finger inputs, are limited.

The present invention provides a number of important technical advantages. One example of an important technical advantage is that improved ground with distributed conical springs biased against the housing palm rest improves touch detection sensitivity and reduces ghost touch errors. By measuring resistance across ground between the distributed conical spring ground devices, an ohmmeter included in the touchpad can allow a processing resource to adjust touchpad sensitivity to reduce ghost finger input errors when resistance is elevated. One example touchpad has a 2 ohm ground resistance specification while the ohmmeter can detect resistance variation to as low as 0.01 ohms. Touch detection accuracy is enhanced by applying measured resistance and ghost touch input detection is reduced.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system touchpad grounds through conical spring ground devices and measure resistance through system ground to adjust touch sensitivity and limit ghost inputs. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O)

devices, such as a keyboard, a mouse, and a video display. The information handling system may also include one or more buses operable to transmit communications between the various hardware components.

Figure 1:
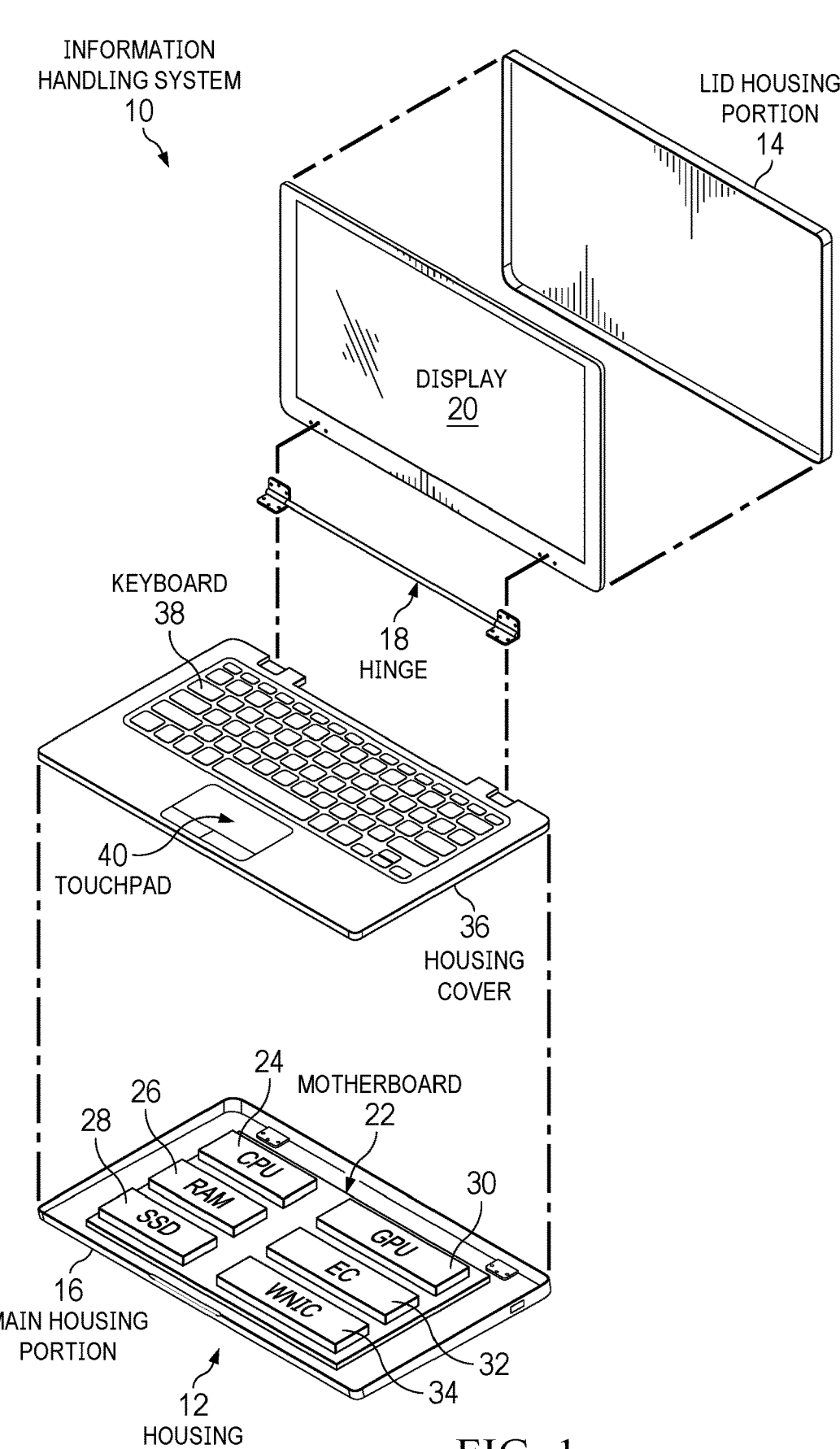
FIG. 1 depicts a perspective exploded view of a portable information handling system having a touchpad.

Referring now to FIG. 1, a perspective exploded view depicts a portable information handling system 10 having a touchpad 40. Information handling system 10 is built in a portable housing 12 having a lid housing portion 14 rotationally coupled to a main housing portion 16 by a hinge 18. A display 20 couples into lid housing portion 14 to present information as visual images. A motherboard 22 couples in main housing portion 16 to interface processing components that cooperate to process information. A central processing unit (CPU) 24 executes instructions that process information. A random access memory (RAM) 26 stores the information and instructions in cooperation with CPU 24. A solid state drive (SSD) 28 provides persistent storage that holds information during power down, such as with flash or other types of non-transitory memory. For instance, SSD 28 stores an operating system and applications that are retrieved to RAM 26 at power up. A graphical processing unit (GPU) 30 interfaces with CPU 24 to further process information for presentation as visual images at display 20. An embedded controller 32 includes non-transitory memory and processing resources that manage system operating conditions, such as application of power, thermal control and interactions with input/output (I/O) devices. A wireless network interface controller (WNIC) 34 supports wireless communication with external devices, such as through WIFI and BLUETOOTH.

In the example embodiment, information handling system 10 includes integrated I/O devices that accept end user inputs. A housing cover 36 couples over main housing portion 16 and supports a keyboard 38 that accepts key inputs, such as a QWERTY keyboard. Display 20 outputs information and also can include a capacitive touch screen that detects touches that performs inputs based upon presented visual images at the touch location, such as a button. A touchpad 40 accepts touch inputs in a manner similar to a mouse that are translated to cursor movements of a pointing cursor presented on display 20. At a front side of touchpad 40 a deflection in the touch detection surface provides a button input similar to pressing a mouse button. In alternative embodiments, separate buttons are exposed at the front side to accept button presses instead of having the touchpad front edge deflect. In the example embodiment, touchpad 40 has a capacitive sensor touch detection surface that detects finger movements and reports the finger movements as cursor movements for moving the cursor on display 20.

Figure 2:
FIG. 2 depicts a bottom view of the touchpad configured to have ground devices at opposing sides to ground against an information handling system housing.

Referring now to FIG. 2, a bottom view depicts touchpad 40 configured to have ground devices 50 at opposing sides to ground against an information handling system housing. In the example embodiment, a circuit board (PCB) 44 couples to a bottom side of a touch detection surface 42 and interfaces touch detection sensors, such as conductive leads that carry an electric charge, with a processing resource 46 that senses touches based on changes to the electric charge. For instance, processing resource 46 is an MCU having integrated flash memory and capacitive touch detection. A trigger bracket 48 biased up by a return spring 52 presses the touch detection surface 42 upward at a front side to allow deflection in response to a press to indicate a button input. On opposite sides at the front of circuit board 44, a ground device 50 extends up and is aligned to contact a part of the information handling system that interfaces with ground. Ground device 50 is, for example, a conical spring of conductive material that is surface mounted (SMT) to circuit board 44 to contact against the palm rest area of the housing cover portion. The spring characteristic ensures a good ground contact when deflection of touch detection surface 42 changes the distance to the housing. In the example embodiment, first and second ground devices 50 are in opposite front corners of circuit board 44, although in alternative embodiments ground devices 50 may be placed in other locations. In one embodiment, ground devices 50 may align with and contact trigger bracket 48 to achieve ground through the coupling location of the bracket.

Figure 3:
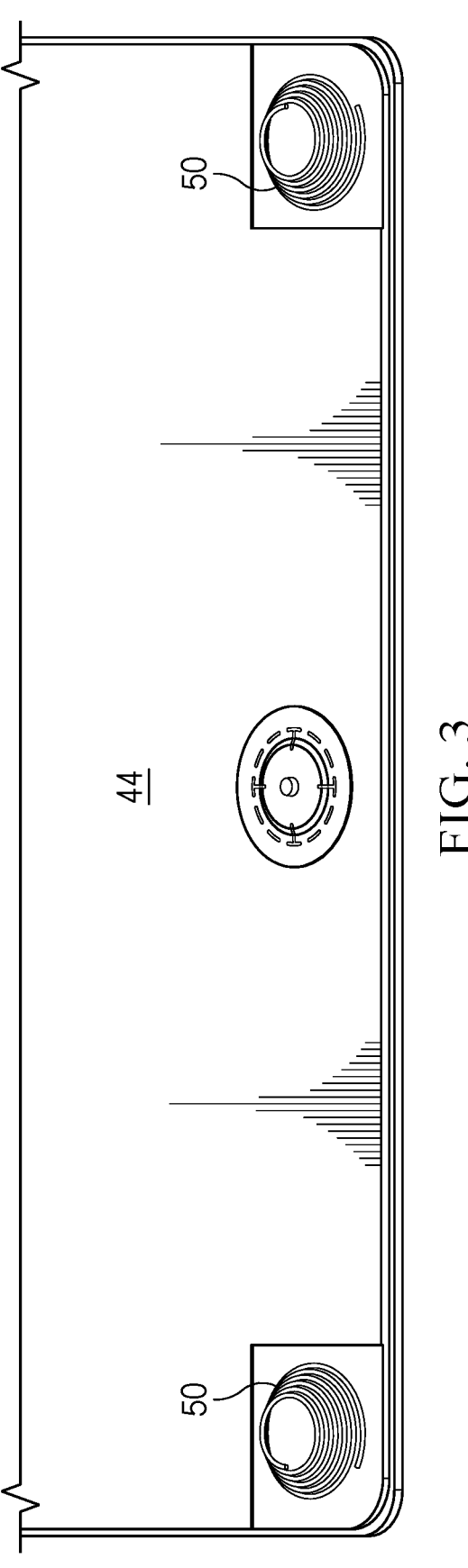
FIG. 3 depicts an upper view of circuit board SMT locations for attachment of ground devices.

Referring now to FIG. 3, an upper view of circuit board 44 depicts SMT locations for attachment of ground devices 50. In the example embodiment, ground devices 50 are conical springs that couple to each of opposite front corner pads of circuit board 44. In other embodiments, other types of ground devices may be used.

Figure 4:
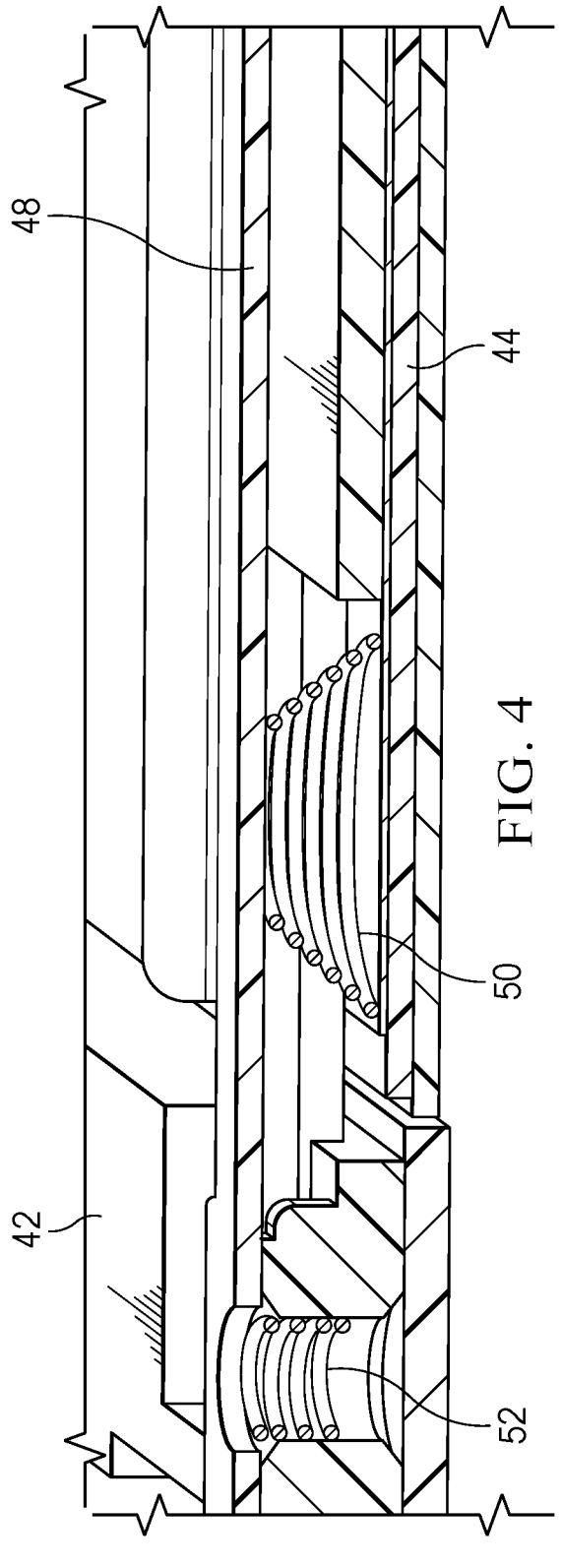
FIG. 4 depicts a sectional view of an example of vertical stacking of a touchpad.

Referring now to FIG. 4, a sectional view depicts an example of vertical stacking of a touchpad 40. Touch detection surface 42 is exposed at an upper side of touchpad 40 and mounted over bracket 48 and circuit board 44. Return spring 52 biases bracket 48 upwards to press touch detection surface 42 to a raised position. When an end user presses on the front side of touch detection surface 42, downward deflection provided by bracket 48 indicates an input. Ground device 50 extends up from circuit board 44 to press against a portion of the housing that provides ground, such as a palm rest defined in the housing cover.

Figure 5:
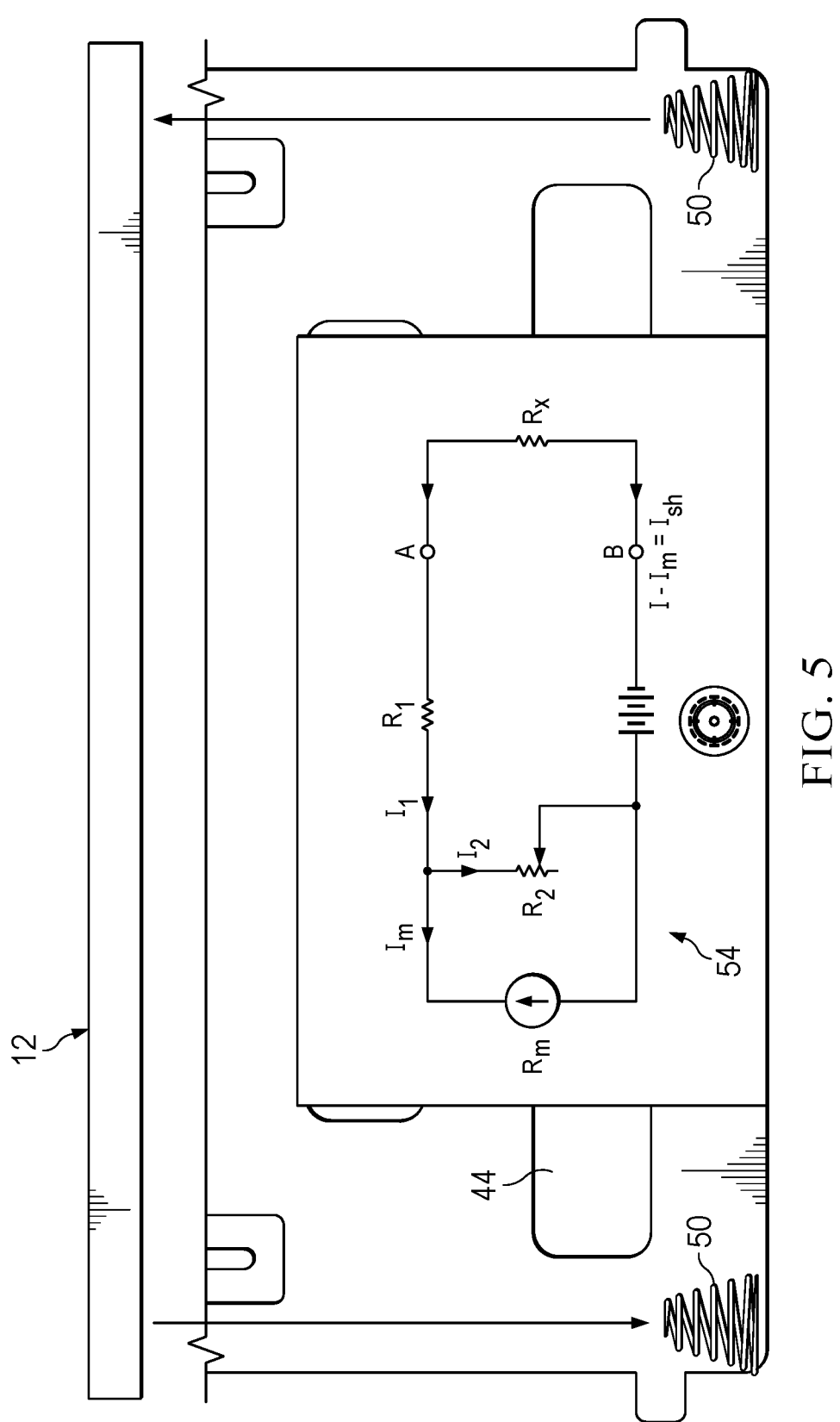
FIG. 5 depicts a block diagram of an example touchpad embodiment that monitors ground resistance to adjust touch detection surface sensitivity.

Referring now to FIG. 5, a block diagram depicts an example touchpad 40 embodiment that monitors ground resistance to adjust touch detection surface sensitivity. A low resistance ohmmeter circuit 54 coupled to circuit board 44 interfaces with processing resource 46 and both ground devices 50 to measure resistance from a first of ground devices 50 through ground of housing 12 to the second of ground devices 50. The output of the low resistance ohmmeter circuit 54 is provided to processing resource 46, which applies the resistance to adjust sensitivity of the touch detection surface. For example, excessive resistance might indicate that the touch detection surface will produce ghost touches if the sensitivity is too great. In response, the processing resource might increase the capacitance measurement needed to detect a touch so that ghost input detection is less likely. In some instances the resistance may indicate a fault so that the touchpad is replaced. In one embodiment, the low resistance ohmmeter circuit is integrated within the touchpad processing resource, such as within an MCU that detects capacitive touch.

Figure 6:
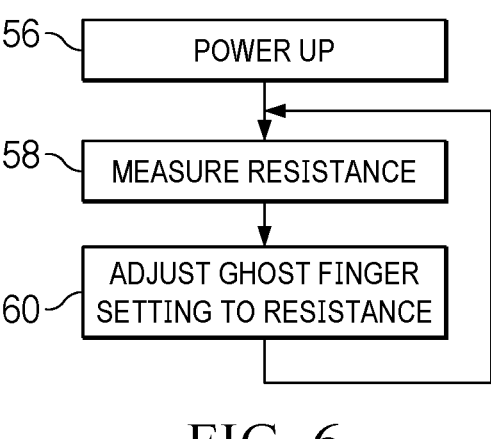
FIG. 6 depicts a flow diagram of a process for applying measured resistance to adjust touchpad sensitivity.

Referring now to FIG. 6, a flow diagram depicts a process for an example embodiment for applying measured resistance to adjust touchpad sensitivity. The process starts at step 56 with power up of the information handling system and calibration of the touch detection surface. At step 58, the touchpad measures resistance from a first ground device on a first side of the circuit board through the housing ground and to a second ground device on a second side of the circuit board. Once the resistance is measured, at step 60 the processing resource on the touchpad circuit board adjusts the capacitive touch detection surface sensitivity to avoid ghost finger input detection. The process then returns to step 58 to continue monitoring resistance and adjusting sensitivity while the touchpad is powered up.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor coupled in the housing and operable to execute instructions to process information;
a memory coupled in the housing and interfaced with the processor, the memory operable to store the instructions and information;
a touch detection surface coupled to the housing and interfaced with the processor, the touch detection surface interfaced with a circuit board having a processing resource, the circuit board grounded to the housing at opposing sides;
an ohmmeter circuit coupled to the circuit board and interfaced with the processing resource, the ohmmeter circuit configured to measure resistance between the grounds at the opposing sides through the housing.

2. The information handling system of claim 1 wherein the touch detection surface further comprises:
a bracket coupled to the housing at the opposing sides and disposed between the touch detection surface and the circuit board;
wherein the touch detection surface accepts button presses by deflection of the bracket from a press at the touch detection surface.

3. The information handling system of claim 2 further comprising:
a first spring biased from the circuit board at a first side and aligned against a first position of the housing, the first spring interfaced with ground of the circuit board; and
a second spring biased from the circuit board at a second side and aligned against a second position of the housing, the second spring interfaced with ground of the circuit board.

4. The information handling system of claim 3 wherein the first and second springs comprise conical springs of conductive material.

5. The information handling system of claim 4 wherein the touch detection surface comprises a capacitive touch detection surface.

6. The information handling system of claim 1 wherein the processing resource applies the resistance to adjust sensitivity of the touch detection surface.

7. The information handling system of claim 6 wherein the ohmmeter circuit integrates within the processing resource.

8. The information handling system of claim 7 further comprising:
a first spring biased from the circuit board at a first side and aligned against a first side of a bracket disposed between the touch detection surface and the circuit board, the bracket coupled to the housing, the first spring interfaced with ground of the circuit board; and
a second spring biased from the circuit board at a second side of the bracket and aligned against a second side of the bracket, the second spring interfaced with ground of the circuit board.

9. A method for managing touch inputs at a touchpad integrated in a portable information handling system, the method comprising:
grounding the touchpad at a first side with a first ground device interfaced with a housing of the information handling system;
grounding the touchpad at a second side with a second ground device interfaced with the housing of the information handling system;

measuring at the touchpad a resistance from the first ground device through the housing to the second ground device;

detecting touches at a touch detection surface of the touchpad with a processing resource interfaced with the touch detection surface;

applying the measured resistance with the processing resource to adjust a sensitivity of the touchpad touch detection surface.

10. The method of claim 9 wherein the measuring a resistance is performed with an ohmmeter integrated in the processing resource.

11. The method of claim 9 further comprising:

coupling a bracket to the housing between the touch detection surface and a circuit board having the processing resource; and grounding the touchpad at the first and second sides to contact a housing of the information handling system to first and second grounding devices coupled to the circuit board.

12. The method of claim 11 wherein the ground devices comprise conical springs coupled to the circuit board.

13. The method of claim 12 further comprising:

pressing down on a front side of the touch detection surface to deflect the bracket; and in response to deflection of the bracket, applying a button press input.

14. The method of claim 13 wherein the touch detection surface comprises a capacitive touch detection surface.

* * * * *